United States Patent [19]

Bi

[11] Patent Number: 5,341,395
[45] Date of Patent: Aug. 23, 1994

[54] DATA RECOVERY TECHNIQUE FOR ASYNCHRONOUS CDMA SYSTEMS

[75] Inventor: Qi Bi, Morris Plains, N.J.

[73] Assignee: AT&T Bell Laboratories, Murray Hill, N.J.

[21] Appl. No.: 982,168

[22] Filed: Nov. 24, 1992

[51] Int. Cl.$^5$ ............................................. H04B 7/216
[52] U.S. Cl. ............................................. 375/1; 375/96; 370/18; 455/38.1
[58] Field of Search ..................... 455/38.1; 370/18; 375/96, 1

[56] References Cited

U.S. PATENT DOCUMENTS

| 4,564,952 | 1/1986 | Karabinis et al. | 375/101 X |
| 4,995,104 | 2/1991 | Gitlin | 370/6 |
| 5,031,173 | 7/1991 | Short et al. | 370/18 |
| 5,151,919 | 9/1992 | Dent | 375/1 |
| 5,170,412 | 12/1992 | Massey | 375/1 |
| 5,177,766 | 1/1993 | Holland et al. | 375/1 |

Primary Examiner—Gilberto Barron, Jr.
Attorney, Agent, or Firm—David R. Padnes

[57] ABSTRACT

To recover the bits from various users in an asynchronous CDMA communications system, samples of the received signal are processed using blocks of code coefficients. Each code coefficient block includes the sequence of code coefficients for each user which formed the received signal samples. Each sequence has the same number of code coefficients and this number is equal to the product of a predetermined number of bit intervals and the number of code coefficients per bit interval. Processing of the received signal samples using this block formation completely eliminates interference including the so-called leading and lagging edge effects and can be implemented with blocks that include the code coefficients in one or more bit intervals.

21 Claims, 5 Drawing Sheets

DATA RECOVERY TECHNIQUE FOR ASYNCHRONOUS CDMA SYSTEMS

TECHNICAL FIELD

The present invention pertains to recovering transmitted data in the receiver of a Code Division Multiple Access (CDMA) system and, more particularly, to such system wherein each user transmits a signal asynchronously to a base station.

BACKGROUND OF THE INVENTION

CDMA is a signal modulation technique used in a variety of applications, such as cellular and wireless communications systems. In such systems, multiple users communicate at will with a base station with each user transmitting a uniquely coded signal. Therefore, the received signal at the base station is a composite of many differently coded signals. Each coded signal is formed by multiplying each of a succession of digital symbols by more than one code coefficient. The product of each symbol times one code coefficient is a "chip" and each chip extends over a portion of the symbol interval known as a chip interval. At the receiver, each user's encoded digital symbols are recovered from the incoming composite signal using code coefficients which replicate those used by each user.

It has long been recognized that during transmission a substantial amount of interference can be introduced into each coded signal from the other coded signals and that this interference must be accounted for intelligible communications. To reduce this interference, one type of prior art system has utilized an interference reduction technique which operates on each user's recovered symbols using priorly recovered other user's symbols. (See, for example, U.S. Pat. No. 5,136,612, issued Aug. 4, 1992 and entitled "Method and Apparatus for Reducing Effects of Multiple Access Interference in a Radio Receiver in a Code Division Multiple Access Communications System".) The problem with this technique is that the interference introduced in any coded symbol involves both prior and future values of the other coded symbols and compensation is not provided for this latter source of interference. Another class of prior art systems uses an approach which operates on the received composite signal over a time interval using blocks of code coefficients wherein each block includes the code coefficients of each user corresponding to this time interval. (See, for example, a publication entitled "Near-Far Resistance of Multiuser Detectors in Asynchronous Channels", *I.E.E.E. Transactions on Communications*, Vol. 38, No. 4, April 1990.) The problem with this approach is that due to the asynchronous nature of the communications each user's signals arrive at an arbitrary time with respect to that of the other users. As a result, received signal samples from the edges of the time interval are processed and such samples contain user signals which are not considered or recovered during block processing. This produces errors which are referred to hereinbelow as the "leading and lagging edge effects".

It would, therefore, be desirable if a more accurate, readily implementable data recovery technique could be developed for CDMA systems.

SUMMARY OF THE INVENTION

Broadly, the shortcomings of the prior art CDMA data recovery techniques are overcome, in accordance with the present invention, by processing the received signal samples formed in a time interval using an associated block of code coefficients. The code coefficient block includes the sequence of code coefficients for each user during the time interval and each sequence has the same number of coefficients. This number is equal to the product of a predetermined number of symbol intervals and the number of code coefficients per symbol interval. Advantageously, processing of received signal samples in this manner facilitates complete elimination of the so-called leading and lagging edge effects and can be implemented with blocks that include code coefficients associated with one or more selected user symbol intervals.

In the disclosed embodiments, received signal samples and code coefficient blocks are processed which correspond to overlapping time intervals. Each block of code coefficients is decomposed into two portions which are utilized to process the received signal samples.

DETAILED DESCRIPTION

Figure 1:
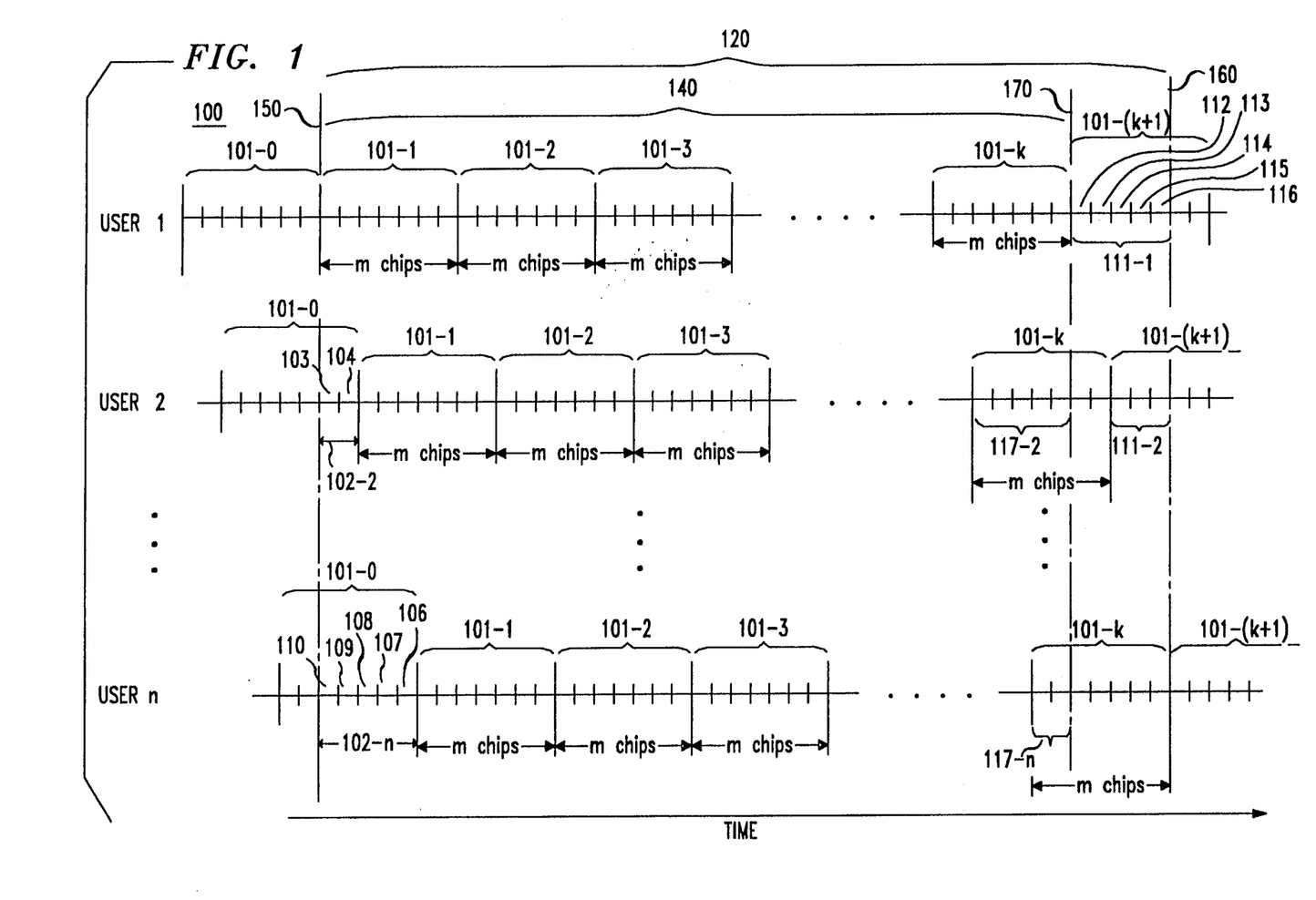
FIG. 1 is a representation of the incoming chip streams of each user at the base station of an illustrative asynchronous CDMA system during a first time interval.

FIG. 1 shows a time-line representation 100 of the chip streams of n users, where n is a predetermined integer, arriving at a base station of an illustrative asynchronous CDMA communications system. Each user's chip stream is represented by one horizontal line, and, for each line, bit intervals 101-0 through 101-(k+1) are shown. In well-known fashion, at the transmitter, each user's symbols within each symbol interval are spread using a spreading code including a plurality of code coefficients. In the disclosed embodiment, each symbol is a bit and the spreading process multiplies each bit by a plurality of code coefficients to generate chips. In FIG. 1, m code coefficients, where m is a predetermined integer greater than 1, are used in each spreading code so that there are m code coefficients or chips associated with each bit. Each chip extends over a chip interval which is a submultiple 1/m of the bit interval. Typically, each spreading code is generated using a pseudo-random generator so that the spreading code is both unique for each user and varies from bit interval to bit interval for any user.

It should be noted that due to the asynchronous nature of the communications between the different users and the base station, each user's transmission arrives at any arbitrary time relative to one of the n users. This delay is represented by offsetting the bitstreams of users 2 through n relative to that for user 1. In FIG. 1, it is assumed that the users are assigned a number from 1 to n, such that as the user number increases from 2 to n, the coded signals arrive progressively later than those for user 1. We may represent this delay for any user i, where i is an integer from 1 to n, by a time interval 102-i. This interval for user 1 is 102-1 and, of course, is equal to zero. In FIG. 1, two time intervals 102-i are shown. In particular, bit interval 101-1 for user 2 lags bit interval 101-1 of user 1 by a time interval 102-2 which contains the 2 chips designated as 103 and 104. Similarly, bit interval 101-1 for user n lags bit interval 101-1 for user 1 by time interval 102-n which contains the five chips designated as 106, 107, 108, 109 and 110. In general, the number of chips contained in the time interval 102-i associated with any of the users is a subset of m, i.e., an integer from 0 to (m−1).

In the prior art, received signal samples during a time interval were processed at the base station using blocks of chips. Each block included the code coefficients in the received signal samples during the time interval which extended from a beginning to an ending time. In FIG. 1, one such prior art block 120 is shown which extends from a beginning time 150 to an ending time 160. It should be noted that beginning time 150 is aligned with the beginning of bit interval 101-1 for user 1 and ending time 160 is aligned with the end of bit interval 101-k for user n. As a result, the block includes the coded signals, i.e., the bits and associated code coefficients of user 1 in the k bit intervals designated as 101-1 through 101-k plus those in the portion of bit interval 101-(k+1) designated as 111-1. In FIG. 1 there are five chips, designated as 112-116, in interval. 111-1. Similarly, for user n, block 120 includes the bits and associated code coefficients in bit intervals 101-1 through 101-k plus those used to encode the chips 106 through 110 in interval 102-n. It should be noted, therefore, that prior an block 120 contains a number of code coefficients for each user equal to the number of chips per bit interval times a noninteger number of bit intervals.

The problem with the processing of a succession of blocks 120 to determine the bits represented by the chips in bit intervals 101-1 through 101-k is that while each block of code coefficients is used to process samples of the received signal from the time interval extending between beginning time 150 and ending time 160, code coefficients in the lagging edge, i.e., intervals 102-i and leading edge 111-i, are used and such code coefficients do not relate to the bits that are determined. While this source of error can be reduced by increasing the value of k, this substantially increases the computational burden.

In order to overcome this shortcoming, in accordance with the present invention, each block is established to include a number of code coefficients for each user exactly equal to a predetermined integer number of bit intervals, k, times the number of chips per bit interval, m. Therefore, pursuant to the present invention, a block 140 is used which includes km code coefficients for each user.

This change in block formation vis-a-vis the prior an is represented by movement of the ending time 160 to position 170. In addition, as will be discussed, a succession of such blocks is formed and each block is formed with respect to a different selected user. In FIG. 1, the selected user is user 1, and for such user the beginning and ending times of the block are respectively aligned with the beginning and ending times of bit intervals 101-1 and 101-k. Note that for the selected user, the block extends over the bit intervals 101-1 through 101-k completely. However, for each of the nonselected users, i.e., users 2 through n, only a portion of the bit interval 101-k is included in the block. In FIG. 1, these portions are designated as 117-2 and 117-n for users 2 and n, respectively. To eliminate the errors due to the leading edge effect errors, since only a portion of the last bit interval 101-k is processed for each of the nonselected users, as will be discussed, the estimate of the bits for these users in these intervals recovered from this block is preferably discarded and recovered from the processing of the next succeeding block. In addition, to eliminate the lagging edge effect, pursuant to the present invention, the sequence of code coefficients for each user within a block is decomposed into first and second portions, the latter portion corresponding to those coefficients in intervals 102-i, and only the coefficients in the first portion will be used for despreading and interference cancellation.

The code coefficients within each block will now be discussed. At the outset, it will be noted that the code coefficients for the ith user, where i designates the user and is any integer from 1 to n, forms a sequence of code coefficients $c_i$ which can be written as:

$$c_i = (c_{i1}, c_{i2}, \ldots, c_{iM})^T. \tag{1}$$

The second subscript of each code coefficient in the sequence $c_i$ represents the position of that coefficient in the sequence. In the disclosed embodiments, each code coefficient is either −1 or +1 and the term M is equal to k times m and denotes the number of samples in each sequence. We will denote the quantized delay of each user relative to the selected user by $p_i$ where i=1, 2, . . . , n. The quantized delay for the selected user is, of course, 0 and the quantized delay for any nonselected user can take on integer values from 1 to (m−1). Referring to FIG. 1, this quantized delay is equal to the number of code coefficients in interval 102-i. Each sequence $c_i$ may be decomposed into (k+1) vectors of dimension M according to the quantized delay $p_i$. Performing this decomposition, we have:

$$c_i^{(j)} = (0, \ldots, 0, c_{i(p_i + jm - m + 1)}, c_{i(p_i + jm - m + 2)}, \ldots, c_{i(p_i + jm)}, 0, \ldots, 0, \ldots, 0)^T, \tag{2}$$

and $$d_i = (c_{i1}, c_{i2}, \ldots, c_{i(p_i)}, 0, \ldots, 0)^T, \tag{3}$$

where j=1,2, . . . ,k, and the superscript T signifies the transpose of a vector.

Note that each vector $c_i^{(j)}$ has M elements and no more than m elements are nonzero. In addition, the number of zeros in Equation 2 preceding and succeeding the nonzero terms for each vector $c_i^{(j)}$ is respectively equal to the value of $p_i$ and the difference between the m, the number of chips per bit interval, and the value of $p_i$. For example, $c_1^{(1)}$ is a vector that has nonzero elements in the first m positions and has zero elements elsewhere. Based on the above notation, we may write:

$$c_i = d_i + \sum_{j=1}^{k} c_i^{(j)}. \tag{4}$$

From the above equations, we can construct two code coefficient matrices:

$$C=(c_1^{(1)},c_2^{(1)},\ldots,c_n^{(1)},c_1^{(2)},c_2^{(2)},\ldots,c_n^{(2)},\ldots\\,c_1^{(k)},c_2^{(k)},\ldots,c_n^{(k)}),\tag{5}$$

and $$D=(d_1,d_2,\ldots,d_n).\tag{6}$$

where C is a matrix having M rows and kn columns, D is a matrix having M rows and n columns and the vector $d_1$ is an all zero vector of dimension M. Therefore, the matrix C contains the code coefficients in the intervals 101-1 through 101-k for the selected user and the code coefficients for each nonselected user in intervals 101-1 through 101-(k−1) and that subset of interval 101-k included in block 140. Moreover, the matrix D contains the code coefficients in interval 102-i for any user and is all zeros for the selected user of a block, i.e., for block 140, $d_1$ is all zeros.

Since each block will be used to recover all user bits in intervals 101-1 through 101-k, the matrix C contains the code coefficients corresponding to all user bits in the interval to be detected, whereas the matrix D contains a portion of the code coefficients in the interval immediately preceding interval 101-1. This immediately preceding interval is designated in FIG. 1 as interval 101-0.

We can denote the bits associated with the chip coefficients in matrix D by the vector $s_0$ where:

$$s_0=(s_1^{(0)},s_2^{(0)},\ldots,s_n^{(0)})^T.\tag{7}$$

In Equation 7, there are n vector components with each such component being a different user bit in interval 101-0. The superscript 0 of each vector component indicates the bit interval and the subscript indicates the user associated with each bit.

We can also denote the message bits associated with the code coefficients in matrix C by the vector s, where:

$$s=(s_1^{(1)},s_2^{(1)},\ldots,s_n^{(1)},s_1^{(2)},s_2^{(2)},\ldots,s_n^{(2)},\ldots\\,s_1^{(k)},s_2^{(k)},\ldots,s_n^{(k)})^T.\tag{8}$$

In Equation 8, the superscript of each vector component designates one of the k bit intervals, and the subscript designates one of the n users. Using the above-described equations, the received signal samples, x at the base station can be written as:

$$x=Cs+Ds_0+n,\tag{9}$$

where x is a vector of dimension M representative of the amplitude of M consecutive received signal samples obtained during block 140, each sample corresponding to a different chip. The term n represents the Gaussian noise in the received signal. This noise has a zero mean and an arbitrary covariance. We can represent the vector x as:

$$x=(x_1,x_2,\ldots,x_M)^T.\tag{10}$$

In general, Equation 9 can be solved to obtain:

$$\hat{s}=(C^T\Gamma^{-1}C)^{-1}C^T\Gamma^{-1}(x-Ds_0),\tag{11}$$

where $\Gamma$ is the well-known covariance matrix of the Gaussian noise, the superscript T indicates the transpose of a matrix, $\hat{s}$ is an estimate of the vector s, and $C^T\Gamma^{-1}C$ is a generalized correlation matrix.

If we consider the special case in which the Gaussian noise is white and stationary, Equation 11 can be written as:

$$(C^TC)s=C^T(x-Ds_0),\tag{12}$$

which can be rewritten as:

$$\hat{s}=(C^TC)^{-1}C^T(x-Ds_0)=R^{-1}C^T(x-Ds_0),\tag{13}$$

where the superscript T indicates the transpose of a matrix, $\hat{s}$ is an estimate of vector s, and R, designated as the correlation matrix of the code coefficients in matrix C, is equal to $C^TC$.

Figure 2:
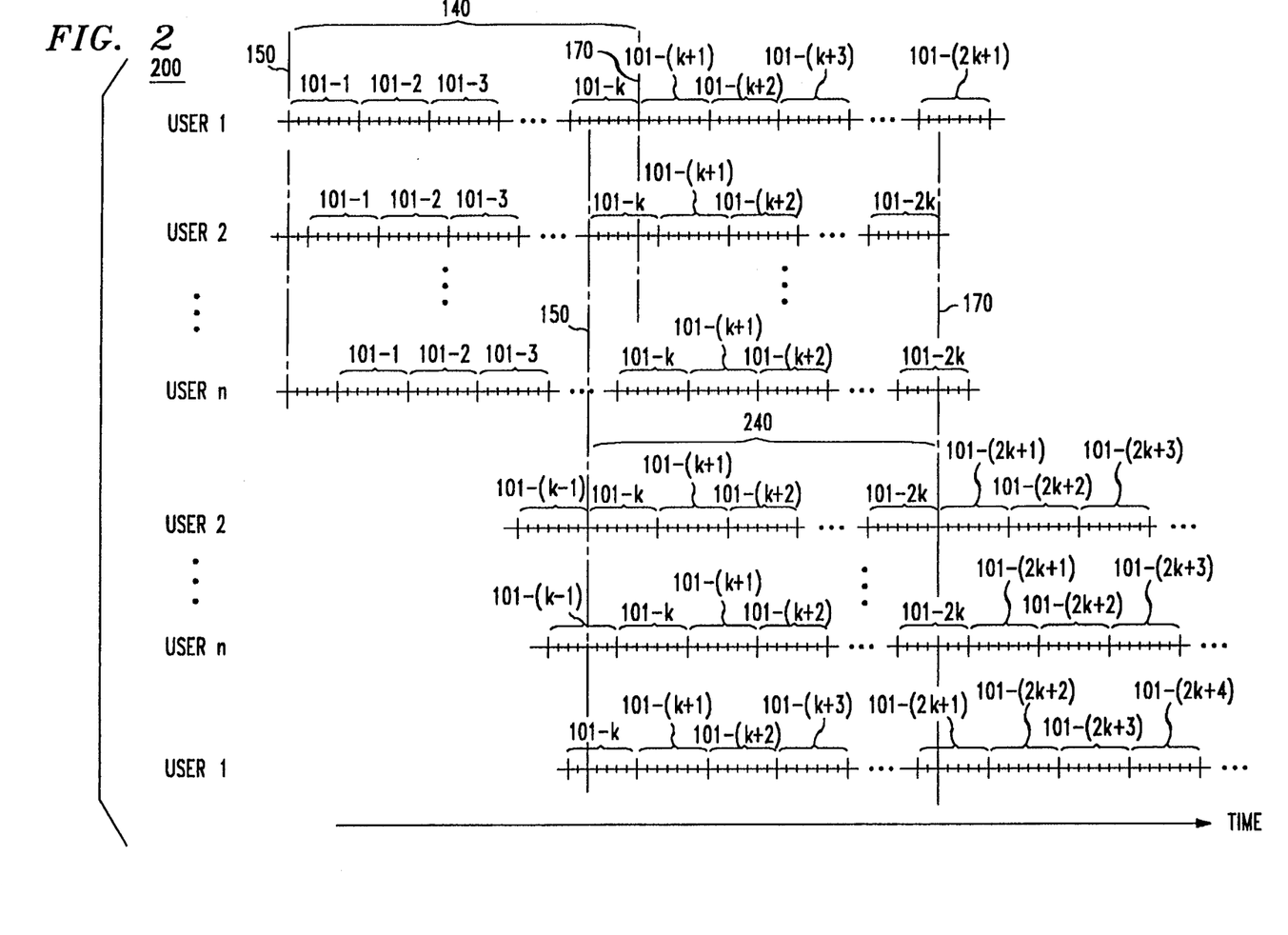
FIG. 2 is a representation of the incoming chip streams of each user at the base station of the illustrative asynchronous CDMA system during a second time interval greater than and including the first time interval.

Equation 11 or 13 can be utilized by the receiver circuitry which incorporates the present invention. However, since Gaussian noise which is white and stationary is more common, for illustrative purposes, the disclosed embodiment will be described assuming this noise characteristic. Before turning to a discussion of such circuitry, it is advantageous to refer to FIG. 2 which illustrates a succession of blocks formed pursuant to the present invention. Referring to FIG. 2, block 140, shown in FIG. 1, is illustrated. The next block formed is designated as block 240 and the selected user for this block is user 2. Block 240 completely includes the k bit intervals 101-k through 101-2k for user 2. Note that the selected user for block 240 is user 2 while the selected user for block 140 is user 1. That is, the selected user number in each block after block 140 is incremented by one in a cyclic fashion. Therefore, for the nth block formed, the selected user is user n and the selected user for the (n+1)th is user 1.

Since block 140 only includes a portion of the chips in interval 101-k for each of the nonselected users, the first bit interval in block 240 is bit interval 101-k for each of the nonselected users in block 140. However, since bit interval 101-k was fully included for the selected user in block 140, the first bit interval for this user in block 240 begins with bit interval 101-(k+1).

Figure 3:
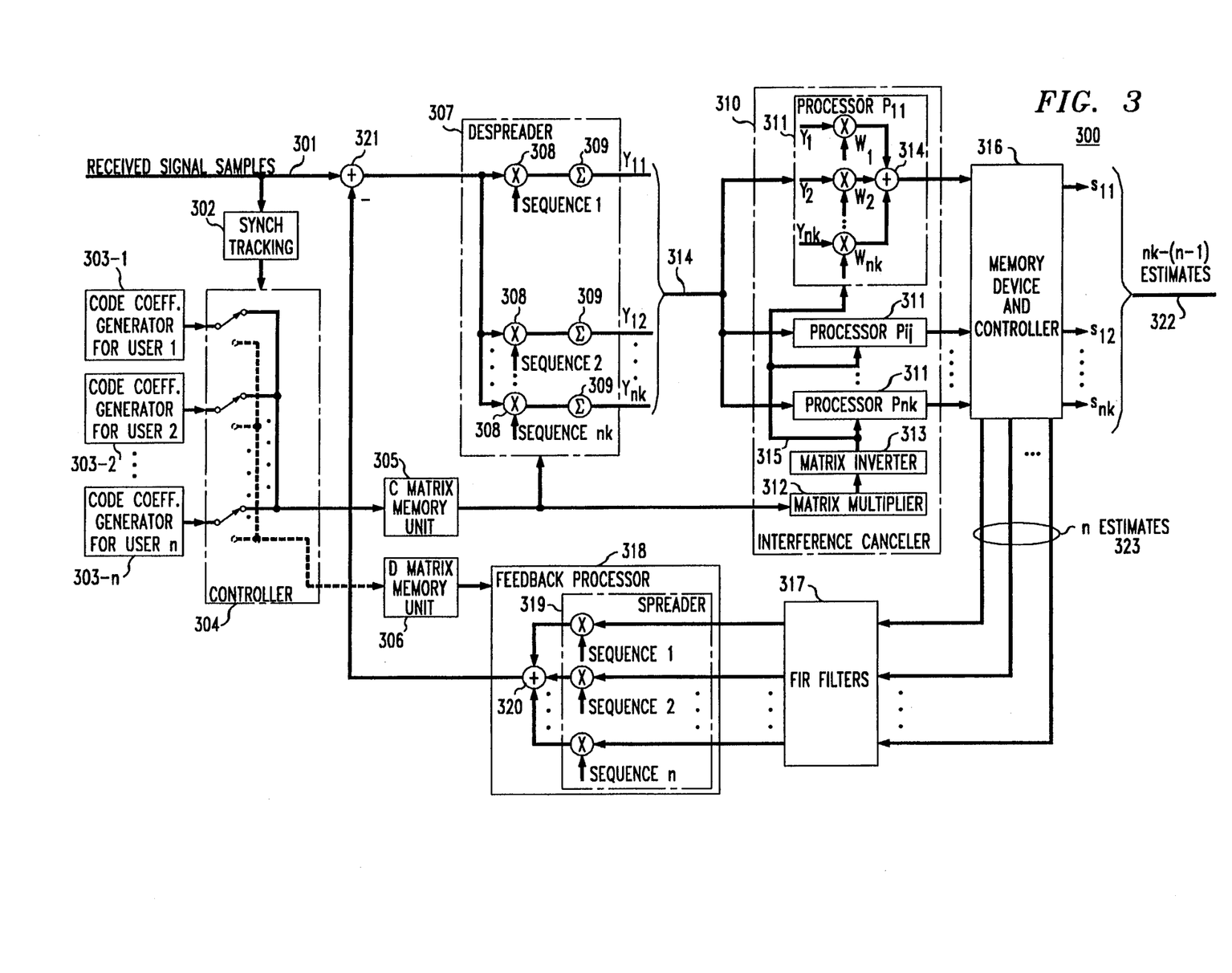
FIG. 3 is a block-schematic diagram of receiver circuitry in accordance with a first embodiment of the present invention.

Refer now to FIG. 3 which shows a block-schematic diagram of receiver circuitry 300 in accordance with a first embodiment of the present invention. Samples of the received signal formed at a sampling rate equal to m samples per bit interval using well-known apparatus (not shown) are coupled to lead 301. Synch tracking unit 302 determines the delay of each user's signals relative to the selected user during each block interval. Code coefficient generators 303-1 through 303-n respectively generate the code coefficients during block interval 140. Each of these n sequences is decomposed into two portions using the delays determined by synch tracking unit 302. One portion corresponds to the code coefficients of each user in the C matrix and this portion is routed via controller 304 to memory unit 305. Similarly, the other portion of code coefficients corresponding to those in matrix D is coupled via controller 304 to memory unit 306.

Despreader 307 despreads the received signal samples in each block to form tentative estimates of the nk bits in the bit intervals 101-1 through 101-k of each of the n users. Each estimate is designated as $Y_{i,j}$ where i=1, 2, ..., n and designates the user, while j=1, 2, ..., k and designates the bit interval in the block. Despreader 307 includes nk multipliers 308 and nk summers 309 which operate in well-known fashion except that they only utilize the code coefficients in the C matrix as opposed to the prior art use of all coefficients in each block, i.e., those in the C and D matrices. Each multiplier, supplied with a different one of the sequences $c_i^{(j)}$ defined by Equation 2, is serially connected to a different summer.

In practical applications, each of the tentative estimates $Y_{i,j}$ contains interference and to remove such interference, circuitry 300 preferably incorporates interference canceller 310. This canceller includes nk identical and well-known processors 311, where each processor receives the nk estimates of the bits received in each block via bus 314. Within each processor, each of the nk estimates $Y_{i,j}$ is multiplied by a different weighting factor. These weighting factors are designated as $W_{i,j}$, where $i=1, 2, \ldots, n$ and $j=1, 2, \ldots, k$.

The matrix $R^{-1}$ is formed from the stored code coefficients in the C matrix for each block by the operation of matrix multiplier 312 and matrix inverter 313. The former generates R, i.e., the product matrix $C^T$ times matrix C, while the latter inverts the matrix R to form $R^{-1}$. If the matrix R is not invertible, i.e., it is a singular matrix, inverter 313 forms a pseudoinverse of the matrix R. The values in matrix $R^{-1}$ are coupled to each processor via bus 315. Within each processor, a different weighting factor is formed using a different row of matrix $R^{-1}$ in well-known fashion. The nk product of each tentative estimate $Y_{i,j}$ and its associated weighting factor $W_{i,j}$, are added together via summer 314. The output of each of the nk processors is a different substantially interference-free estimate $s_{i,j}$ of the nk bits in each block. These estimates are coupled through memory device and controller 316 which advantageously removes those bit estimates in bit interval 101-k for each of the nonselected users. Accordingly, $n-1$ estimates are removed and bus 322 provides $nk-(n-1)$ estimates. The $n-1$ removed estimates are those estimates of nonselected user bits in the last bit interval in a block. Such removal is advantageous, since the receiver has not processed all of the m received signal samples in interval 101-k nor has it used all of the m chips in this bit interval for the nonselected users. Consequently, the removed estimates are those which are error prone and final estimates of the nonselected user bits in bit interval 101-k will be outputted after processing the next formed block.

Memory device and controller 316 also outputs n estimates on bus 323. These estimates include an estimate of the selected user bit in the last bit interval in the block and the $n-1$ estimates of the nonselected user bits in the next to last bit interval in the block. The product $Ds_0$ in Equation 13 is provided by the operation of FIR filters 317 and feedback processor 318. Filters 317 provide a smoothing operation on the n outputted final estimates on bus 323. These smoothed final estimates are then respread by spreader 319 and then summed by adder 320. The spreader operates in the same fashion as a spreader in each user's transmitter except that it utilizes the coefficients in the D matrix. Adder 321 subtracts the product $Ds_0$ from each received signal sample. Referring back to FIG. 2, for block 240, $s_0$ contains the bit estimate of user 1 in bit interval 101-k and the bit estimates for users 2 through n in bit interval 101-(k−1). Similarly, for the block immediately following block 240, $s_0$ contains the bit estimates for users 1 and 2 in bit interval 101-2k and the bit estimates of user 3 through n in bit interval 101 (2k−1). However, since the D matrix component for the selected user in any block is all zeros, the feedback loop forming the term $Ds_0$, provides the product of the bit estimate of each nonselected user in the most recent bit interval and the associated D matrix code coefficients.

Equation 12 can be rewritten as:

$$s = R^{-1}C^T x - R^{-1} C^T D s_0. \quad (13)$$

Figure 4:
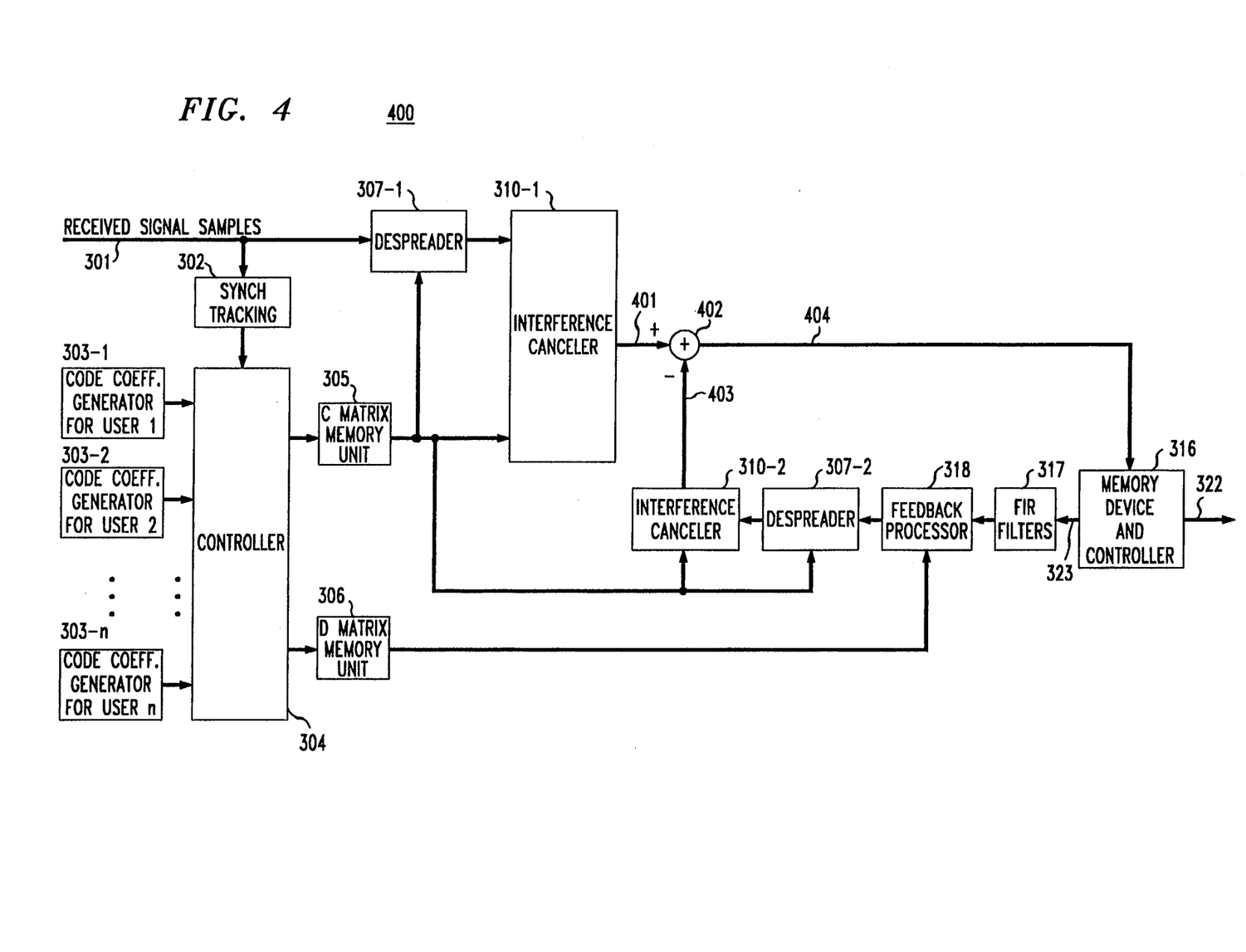
FIG. 4 is a block-schematic diagram of receiver circuitry in accordance with a second embodiment of the present invention.

A second embodiment of the present invention implements Equation 13 and is shown in FIG. 4. As shown in FIG. 4, receiver circuitry 400 utilizes the same components shown in the first embodiment but rearranges these components to conform to Equation 13. In addition, two of the despreaders in FIG. 1, designated in FIG. 4 as 307-1 and 307-2, and two of the interference cancellers in FIG. 1, designated in FIG. 4 as 310-1 and 310-2, are now used.

As shown, code coefficients 303-1 through 303-n, synch tracking unit 302 and controller 304 operate as in FIG. 3 to couple the C matrix and D matrix coefficients to memory units 305 and 306, respectively. Despreader 307 and interference canceller 310 are supplied with the C matrix code coefficients to form the term $R^{-1}C^T x$ on bus 401. Adder 402 combines the estimates on bus 401 with those on bus 403 to provide an output on bus 404. Memory device and controller 316 functions in the same manner as in FIG. 3 to provide the $nk-(n-1)$ estimates on bus 322.

The second term of Equation 13, i.e., $R^{-1}C^T D s_0$, appears on bus 403 and is generated by coupling the n estimates from memory device and controller 316 on bus 323 through serially connected FIR filters 317, feedback processor 318, despreader 307 and interference canceller 310. The C matrix code coefficients from memory unit 305 are coupled to interference canceller 310-2 and despreader 307 while the D matrix code coefficients in memory unit 306 are supplied to feedback processor 318.

Figure 5:
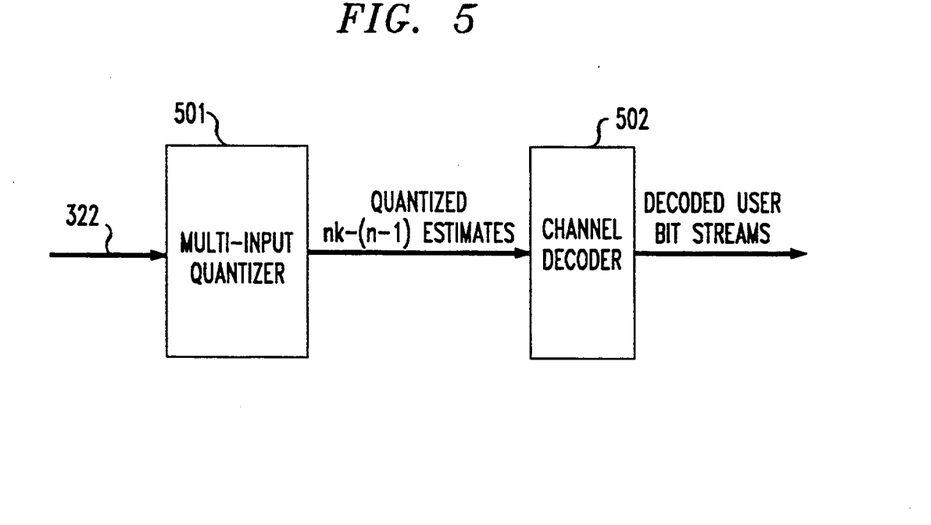
FIGS. 5, 6 and 7 are block-schematic diagrams of alternate additional circuitry which can be used with the circuitry of either FIG. 3 or 4.
Figure 6:
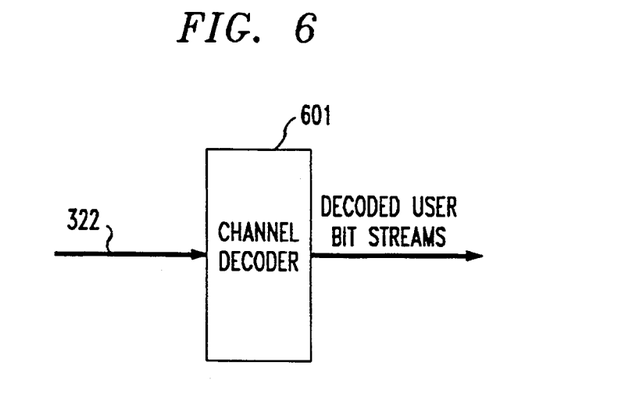
Figure 7:
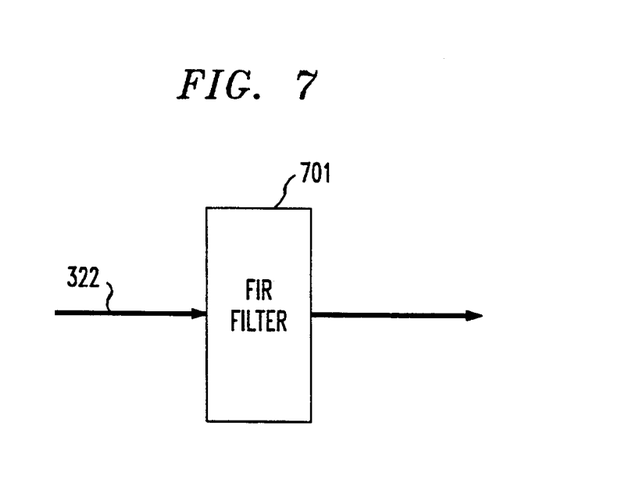

The circuitry in either FIG. 3 or FIG. 4 can be thought of as an estimator and the outputted estimates are real-valued signals. To convert these outputs to binary outputs, the circuitry shown in FIG. 5 or 6 could be coupled to output bus 322. FIG. 5 shows what is commonly referred to as a "hard" decision decoding arrangement including a multi-input quantizer 501 which is serially connected to a channel decoder 502. A "soft" decision decoding arrangement is shown in FIG. 6 and is provided by connecting channel decoder 601 to bus 322. Another use of the circuitry in FIGS. 3 and 4 can be realized by combining either of these FIGS. with FIG. 7. In this regard, it should be noted that the outputs of FIGS. 3 and 4 are representations of the instantaneous power of the received signal. By coupling either one of these outputs to FIR filter 701 shown in FIG. 7, integration of the instantaneous power is provided. Therefore, the combination of FIGS. 3 and 7 or 4 and 7 forms a power estimator.

It should, of course, be noted that while the present invention has been described in terms of an illustrative embodiment, other arrangements will be apparent to those of ordinary skill in the art. First, for example, while the disclosed embodiments operate in environments where the Gaussian noise is white and stationary, the present invention is applicable to other noise characteristics by modifying circuit operation to implement Equation 11. This merely requires that the generalized correlation matrix be used instead of the correlation matrix in the embodiments of FIGS. 3 and 4. Second, while in the disclosed block formation there is an overlap of one bit interval between successive blocks, an overlap of a plurality of bit intervals can be used. Such use may provide an opportunity for improvement in the detection process as multiple estimates of the same user bit are provided. Typically, when two such estimates are not the same, the later formed estimate is chosen. In addition, when two estimates of the same user bit in the same bit interval are not the same, this condition may be used as an indication that a problem exists in the detection process. Third, while the disclosed embodiments have been described relative to a CDMA system wherein user bits are coded, the present invention is also applicable to such systems wherein user symbols, each symbol representative of a plurality of bits, are coded. Finally, while the disclosed embodiments utilize discrete devices, the devices can be implemented using one or more appropriately programmed general-purpose processors or special-purpose integrated circuits or digital processors or an analog or hybrid counterpart of any of these devices.

I claim:

1. Apparatus for use in a CDMA system wherein each of a plurality of users transmits a coded user signal, each coded user signal being formed by spreading each of that user's symbols using a code coefficient sequence and wherein a received signal includes a composite of the transmitted coded user signals, said apparatus comprising means for receiving samples of said received signal in a time interval; and means responsive to said received signal samples for estimating at least one symbol of a user in said time interval, said estimating means altering said received signal samples in response to a first portion of the code coefficient sequences of said plurality of users in said time interval and processing the altered received signal samples in response to a second portion of the code coefficient sequences of said plurality of users, said first and second portions being different from one another and said first portion being less than all of the code coefficients in the code coefficient sequences of said plurality of users in said time interval.

2. The apparatus of claim 1 wherein each sequence of code coefficients is a pseudorandom sequence.

3. The apparatus of claim 1 wherein said second portion is less than all of the code coefficients in the code coefficient sequences of said plurality of users in said time interval.

4. The apparatus of claim 1 wherein said estimating means processes said altered received signal samples also in response to said first portion.

5. The apparatus of claim 1 wherein said first and second portions include nonoverlapping portions of one code coefficient sequence in said time interval.

6. The apparatus of claim 1 wherein said estimating means includes one section responsive to said first portion for altering said received signal samples and another section responsive to said second portion for despreading and cancelling interference in the altered received signal samples.

7. The apparatus of claim 6 wherein said one section forms a feedback path about said another section.

8. The apparatus of claim 1 wherein said time interval is one of a plurality of successive time intervals and said receiving and estimating means respectively receives samples of said received signal and estimates at least one symbol of said user in each of said plurality of time intervals.

9. The apparatus of claim 8 wherein said plurality of successive time intervals overlap one another by a predetermined amount.

10. The apparatus of claim 9 wherein said predetermined amount is at least one symbol interval.

11. The apparatus of claim 1 wherein said estimating means includes signal despreading means.

12. The apparatus of claim 11 wherein said estimating means further includes interference cancelling means.

13. The apparatus of claim 1 wherein said estimating means forms estimates of each user's symbols in said time interval and said estimating means discards at least one of these estimates.

14. The apparatus of claim 1 further including decoding means connected to said estimating means for decoding all user symbol estimates.

15. The apparatus of claim 1 further including a serially connected quantizing means and decoding means connected to said estimating means.

16. The apparatus of claim 1 further including means for integrating estimates of said user's symbols.

17. Apparatus for use in a CDMA system wherein a received signal includes signals transmitted by a number of users, said received signal being a composite of transmitted signals from a plurality of users, each user transmitted signal being formed by spreading that user's symbols with an associated code coefficient sequence, apparatus comprising means for receiving a sequence of samples of said received signal, said samples being formed during each of a succession of time intervals;

means for altering said sequence of received signal samples formed in one time interval in said succession in response to user signal estimates recovered from a time interval prior to said one time interval; and means for estimating the signals transmitted by said number of users included in said received signal samples formed in said one time interval using said altered sequence of received signal samples.

18. A method for use in a CDMA system wherein each of a plurality of transmitted user signals are formed by processing each user's symbol extending over a symbol interval by a plurality of code coefficients to form a coded signal for each user and wherein a received signal includes a composite of said plurality of coded user signals, said method comprising the steps of receiving a succession of received signal sample sequences, each sequence corresponding to a different associated time interval and each associated time interval overlapping an immediately preceding time interval by a predetermined amount; and processing each sequence of received signal samples using code coefficients of said users corresponding to each associated time interval to form an estimate of a user's symbol in each time interval.

19. Apparatus for use in a CDMA system wherein a received signal includes signals transmitted by a number of users, said apparatus comprising a signal combiner having first and second inputs and an output, said received signal being connected to said first input;

a despreader for processing the output of said signal combiner to form estimates of each transmitted user signal; and means responsive to the formed estimates of each transmitted user signal for providing a signal to the second input of said signal combiner.

20. Apparatus for use in a CDMA system wherein a received signal includes signals transmitted by a number of users, said apparatus comprising
- a signal combiner having first and second inputs and an output which provides estimates of each transmitted user signal;
- first means responsive to received signal samples and connected to said first input, said first means including a serially connected despreader and interference canceller; and
- second means connected to said output and said second input, said second means including another serially connected despreader and interference canceller.

21. A method for use in a CDMA system wherein each of a plurality of transmitted user signals are formed by processing each user's symbol extending over a symbol interval with a plurality of code coefficients to form a coded signal for each user and wherein a received signal includes a composite of said plurality of coded user signals, said method comprising the steps of
- receiving samples of said received signal in a time interval; and
- estimating at least one symbol of a user in said time interval in response to said received signal samples and a code coefficient sequence for each user corresponding to said time interval, each sequence including the same number of code coefficients and this number being equal to said plurality of code coefficients times a predetermined integer number of symbol intervals.

* * * * *